March 4, 1969

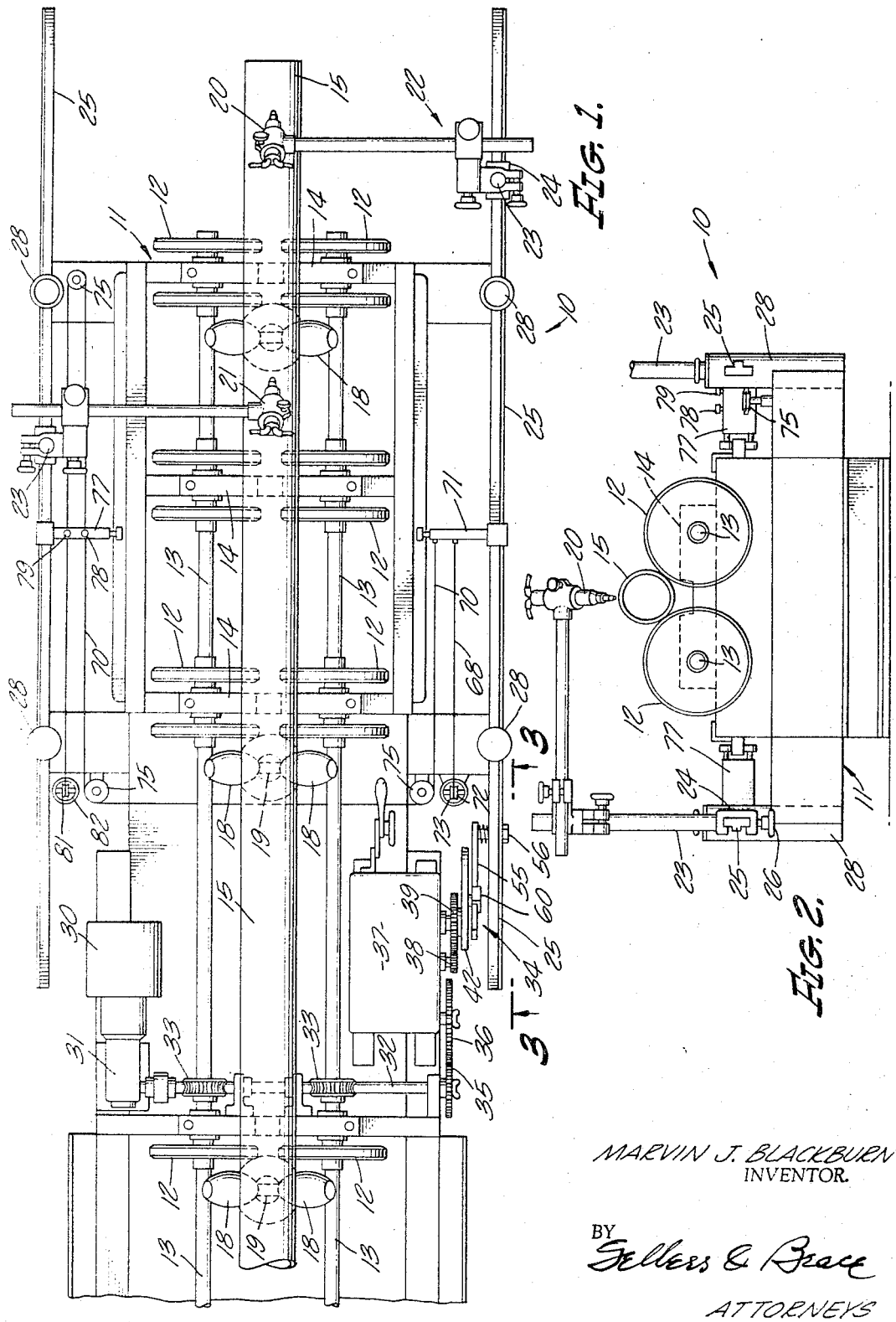

M. J. BLACKBURN 3,430,938

SIMPLIFIED AUTOMATIC PIPE CUTTING MACHINE

Filed Oct. 28, 1966

MARVIN J. BLACKBURN
INVENTOR.

BY Sellers & Brace
ATTORNEYS

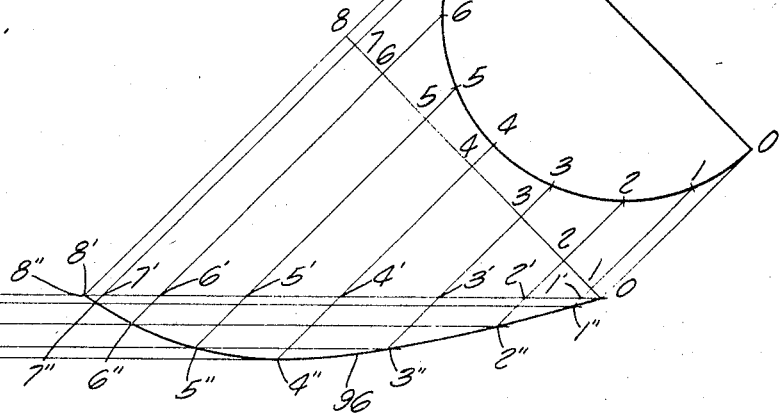
FIG. 7
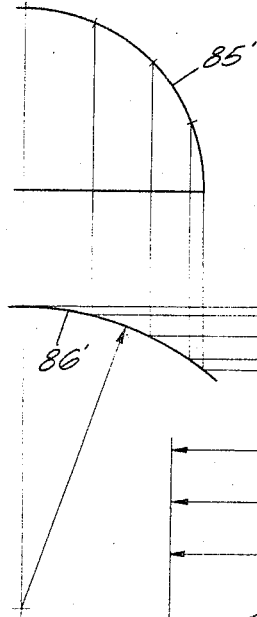
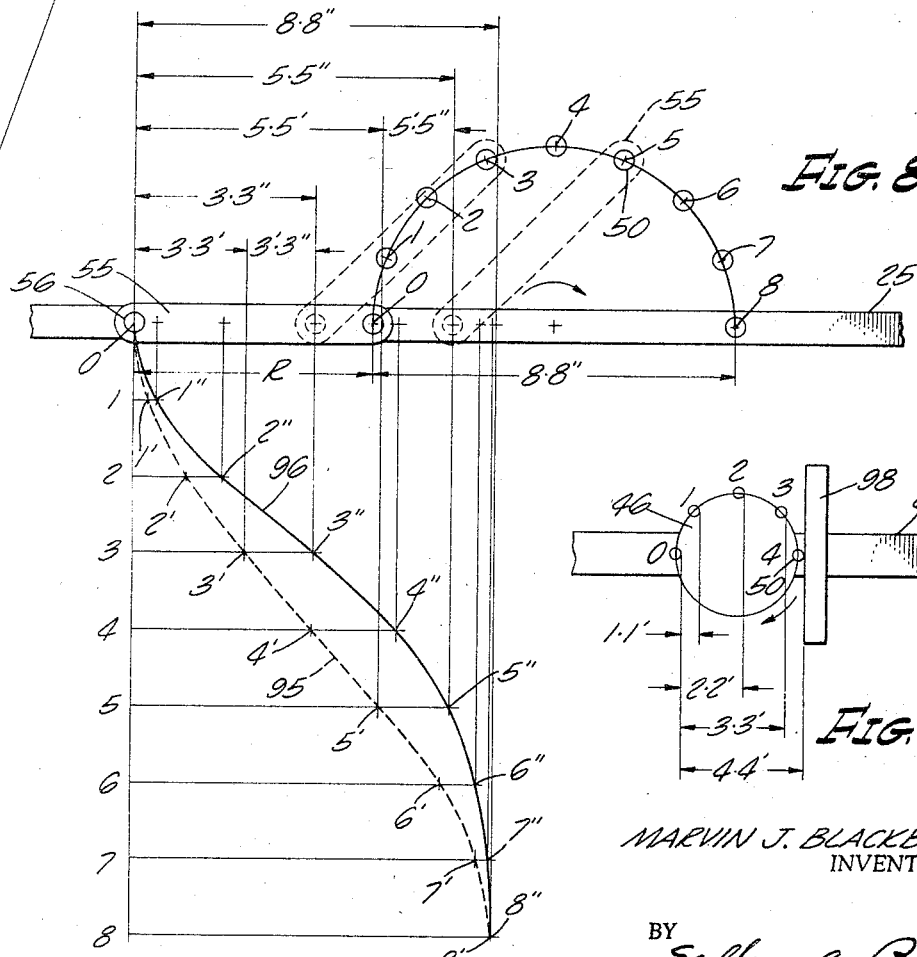
FIG. 8.
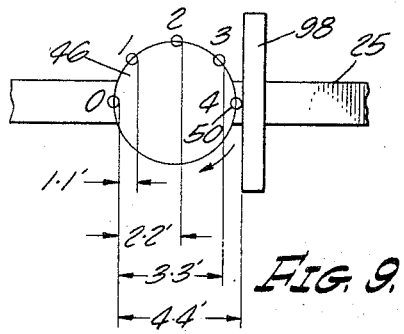
FIG. 9.
MARVIN J. BLACKBURN
INVENTOR.
BY
Sellers & Brace
ATTORNEYS

United States Patent Office 3,430,938
Patented Mar. 4, 1969

3,430,938
SIMPLIFIED AUTOMATIC PIPE CUTTING
MACHINE
Marvin J. Blackburn, Pasadena, Calif., assignor to Vernon Tool Co., Ltd., Alhambra, Calif., a corporation of California
Filed Oct. 28, 1966, Ser. No. 590,349
U.S. Cl. 266—23                    12 Claims
Int. Cl. B21d 43/28

ABSTRACT OF THE DISCLOSURE

An automatic pipe cutting machine for cutting pipe along a wide variety of complex parameters suitable for welding to other pipes at various angles. The machine utilizes easily and quickly adjustable mechanisms for changing the machine from one type of cutting pattern to another using a minimum number of adjustable components. The equipment embodies simple means for minimizing and compensating for errors which otherwise would be present to an objectionable degree in performing certain cutting operations. The mechanism utilizes an adjustable eccentric having a connecting rod drive to the carriage supporting the cutting torch and is optionally connectible to the carriage from either side of the eccentric. If one mode of connection is used, the compensation is positive whereas it is negative if the opposite mode of connection is employed.

---

This invention relates to pipe cutting machines and more particularly to an improved simplified automatic machine readily adjustable to flame cut the end of a pipe or other tubular member along an appropriate contour to facilitate the bonding of the pipe end to a header or a flat member at any of a wide range of angles and for header and branchout pipes of a wide range of relative sizes.

There have been proposed heretofore various automatic pipe cutting machines utilizing flame cutting torches in combination with guiding mechanisms capable of providing appropriate relative movement between the flame and the pipe undergoing cutting to facilitate joining the pipe to a header or the like by welding. However, such machines as heretofore proposed are subject to numerous limitations and disadvantages sought to be avoided by the present invention. More particularly, pipe cutting machines as heretofore proposed for cutting pipe of a range of sizes are notable for their complexity, the number of component parts, the number of moving joints subject to wear, and to cumulative errors. Other machines minimize the number of moving components and the problem of cumulative error but necessitate the use of a special cam for each different type, size and different angular relationship between the pipes being joined. Moreover, the cam must be precisely oriented during assembly to the machine.

A further difficulty to which prior equipment is subject is the fact that highly trained and skilled workmen are required to operate the machine. This adds very materially to the operating expenses of the machine and to the problem of training both normal and standby operators for the equipment.

With the foregoing and other shortcomings of prior equipment in mind it is an object of the present invention to provide a much simpler, more rugged and more versatile automatic machine for making either single or multiple simultaneous cuts in metal tubing preparatory to welding or bonding the ends to a header or cylindrical member. Briefly, the machine provided by this invention comprises a rigid main frame provided with means for supporting and rotating a tube in unison with torch cutting drive means reciprocal lengthwise of the tube and operative to sever the tube along an appropriate path as required for joining the trimmed ends to another pipe at any of a wide range of angles. Typically, the pipe is supported horizontally on rollers driven in unison with the torch guiding means. If multiple cuts are to be made at the same time, separate cutting torches are arranged to be reciprocated along identical paths with the trimmed edges facing in either the same or opposite directions depending upon whether both torches are reciprocated in the same or in opposite directions.

Another feature of the invention is the provision of simplified adjustable drive mechanism for the cutting torches and including an adjustable crank or eccentric in combination with a connecting rod of adjustable length for connecting the crank pin with a reciprocable drive for the cutting torch. In general, the eccentric is adjustable to accommodate pipes of different diameters whereas the adjustable connecting rod joining the crank pin to the torch drive is effective to introduce either a positive or negative corrective factor as necessary to compensate for different relative sizes of main and branchout pipes. Either the negative or positive corrective factor is employed depending upon whether the branchout is generally of right angles or generally at an acute angle to the header, the negative correction being necessary when the joint is one generally at right angles whereas a positive correction factor is necessary when the junction lies at an acute angle. In those cases where the correction factor is very small or negligible the connecting rod may be omitted and, in its place, an accessory drive device may be connected between the crank pin and the torch drive along with suitable means for continuously biasing the accessory into driving contact with the crank pin.

Accordingly, it will be understood that the invention pipe cutting machine, utilizing either the above mentioned drive accessory or the adjustable connecting rod accessory, is effective to trim the ends of branchout pipes ranging in size from 2 to 72 inches or more in diameter suitable for welding to a flat plate or to header pipe of any size at angles either generally in the vicinity of 90 degrees or in the general vicinity of 30 to 60 degrees, all without resort to the use of specially designed cams or of complex linkages. In those cases where it is desired to form the junction at angles lying to either side of those just mentioned, a suitable cam may be secured between the eccentric and the cutting torch drive rod.

It is therefore a primary object of the present invention to provide a simplified, rugged and versatile automatic pipe cutting machine operable to flame-cut the end of a branchout pipe along a parameter suitable for bonding the branchout to a header.

Another object of the invention is the provision of simplified driving mechanism adapted to be interposed between pipe rotating means and reciprocal flame cutting means operable to position the torch to trim the pipe along a desired compound parameter.

Another object of the invention is the provision of an automatic pipe cutting drive mechanism featuring an adjustable crank driving a connecting rod of adjustable length having its remote end arranged to reciprocate a cutting torch lengthwise of a pipe to be trimmed or severed into multiple parts.

Another object of the invention is the provision of a cutting torch positioning means for use on a pipe cutting machine and featuring an adjustable connecting rod arranged to introduce selectively a positive or negative corrective factor depending upon the angular relationship of a branchout pipe to be trimmed and the header to which it is to be connected.

Another object of the invention is the provision of simplified rugged and versatile driving mechanism interposable between a tube rotating means and a torch reciprocating means and utilizing a minimum number of components and relatively moving parts subject to wear and cumulative error.

These and other more specific objects will appear upon reading the following specification and claims and upon considering in connection therewith the attached drawings to which they relate.

Referring now to the drawings in which a preferred embodiment of the invention is illustrated.

FIGURE 1 is a top plan view of an illustrative embodiment of the invention automatic pipe cutting machine;

FIGURE 2 is a generally transverse elevational view across the right hand end of the machine as viewed in FIGURE 1;

FIGURE 7 is a view generally similar to FIGURE 5 but showing the branchout lying at 45 degrees to the header;

FIGURE 8 is a view similar to FIGURE 6 showing the drive mechanism suitably adjusted to cut the end of the branchout shown in FIGURE 7; and FIGURE 9 is a view showing the alternate drive accessory interposed between the eccentric crank pin and the cutting torch reciprocating means and usable when cutting smaller size branchout pipes.

Figure 3:
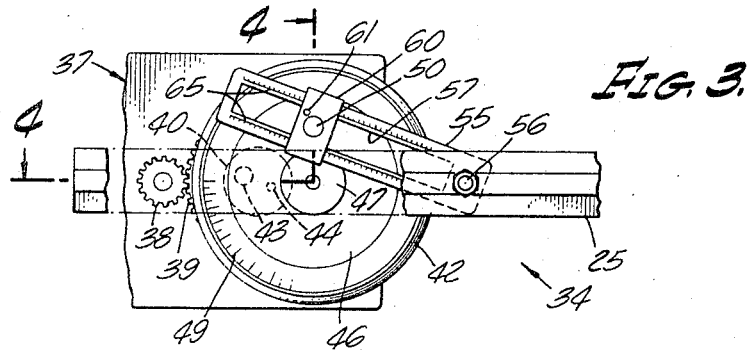
FIGURE 3 is a fragmentary elevational view on an enlarged scale of the torch cutting drive mechanism as viewed along line 3—3 on FIGURE 1.

Referring initially more particularly to FIGURES 1 and 2, there is shown an illustrative embodiment of an automatic pipe cutting machine, designated generally 10, incorporating the features of the present invention. This machine has a main frame 11 equipped with a plurality of driven friction wheels 12, 12 mounted on parallel shafts 13, 13 journaled in pillow boxes 14. A typical long section of pipe 15 to be cut into shorter sections is shown supported on drive wheels 12, 12 and is rotated by means to be described presently.

Initially and between individual pipe cutting operations, pipe 15 may be elevated out of driving contact with the rims of drive wheels 12, 12 as by pairs of rollers 18 supported on the arms of separate Y-brackets 19. These brackets are capable of being elevated and lowered by means, not shown, and to the extent necessary to support either pipe 15 entirely out of contact with drive rollers 12 or in driving contact therewith. The individual idlers 18 rotate freely about the arms of Y-bracket 19 and permit a pipe resting on the idlers to be moved lengthwise of the pipe to any desired cutting position. Once the pipe has been positioned as desired for a cutting operation, the Y-brackets are lowered out of contact with the pipe which then rests directly on the several pairs of drive rollers 12, 12.

The flame cutting torches 20, 21 are supported on adjustable brackets each having an upright pedestal 23 (FIGURE 2) equipped with a C-clamp 24 at their lower ends for clamping the pedestals in any desired position along a reciprocal rigid rod 25. As is made clear by FIGURES 1 and 2, there is a separate rod 25 along either side of the main frame respectively supporting an associated cutting torch clampable in any desired position along rod 25 by clamping screws 26. Rods 25, here shown as being T-shaped in cross-section, are reciprocally supported in openings through guide posts 28 projecting upwardly from main frame 11.

The driving mechanism for rotating the pipe and simultaneously reciprocating the torch supporting rods 25, 25 includes a main drive motor 30 secured to the main frame and connected through a speed reduction unit 31 to a main drive worm 32. This worm meshes with worm wheels 33, 33 keyed to the drive shafts 13, 13 and is effective to rotate the pipe slowly while being cut by torches 20, 21. Worm 32 is also connected through change gears 35, 36 to an adjustable speed power transmission mechanism 37 having a power output gear 38 in mesh with a gear 39. The latter gear powers the torch driving mechanism 34. This mechanism comprises an adjustable crank having a connecting rod 55 of adjustable length connecting this crank to reciprocate the torch carrying rods 25, 25. The details of these components are of importance and will now be described in detail.

Figure 4:
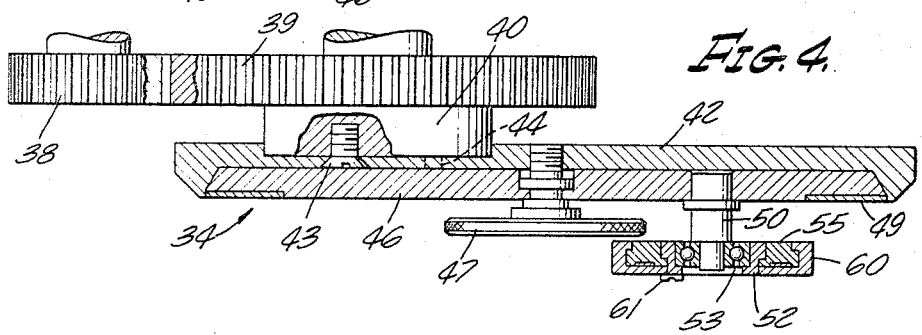
FIGURE 4 is a fragmentary cross sectional view on an enlarged scale taken generally along line 4—4 on FIGURE 3.

Referring now more particularly to FIGURES 3 and 4, it will be understood that driven gear 39 has a hub 40 to which is secured a shallow cup-shaped member 42 by means of a screw 43. There is also a pin 44 carried off-center from the axis of hub 40 which projects into an opening in the bottom of member 42 and cooperates with screw 43 in holding member 42 firmly and nonrotatably anchored to hub 40.

Having a close sliding fit with the interior bottom and side walls of member 42 is a disc 46 which is normally held fixedly and nonrotatably clamped to member 42 by a clamping screw 47. When this screw is slightly loosened it will be apparent that disc 46 may be rotated relative to member 42. After a desired adjustment has been obtained screw 47 is firmly tightened to clamp the inwardly converging rim of the disc against the outwardly flaring interior side walls of member 42. To facilitate setting disc 46 in a desired position, the peripheral area of disc 46 is provided with an appropriate accurate scale 49 cooperating with indicia on the adjacent rim edge of member 42 and calibrated to aid the operator in rotating disc 46 to an appropriate position for obtaining a predetermined amount of torch travel.

Rigidly secured to disc 46 and projecting outwardly therefrom is a stub shaft or crank pin 50. Suitably mounted on the shouldered outer end of crank pin 50 is a ring 52 and a supporting antifriction bearing assembly 53. As will be observed from FIGURES 3 and 4, crank pin 50 is offset from the center of clamping screw 47 and the corresponding center of disc 46 by a distance representing the eccentricity of disc 46 relative to the axis of hub 40. When disc 46 is adjusted to one of its extreme positions, crank pin 50 has a maximum throw relative to the axis of hub 40, whereas, in its other extreme position, the axis of the crank 50 coincides with the axis of driving hub 40 and the crank has zero throw. As shown in FIGURE 3, the eccentricity of the crank pin is midway between its minimum and maximum positions.

The final component forming an important feature of drive mechanism 34 for the cutting torch comprises a connecting rod 55 having a remote end selectively connectable to reciprocal rod 25 on either the upstream or the downstream side of member 42. This connection comprises a nut and shouldered bolt 56 extending through appropriately positioned holes in rod 25. The midportion of connecting rod 55 has an elongated shouldered slot 57 and a shouldered opening at one end shaped to have a close assembly fit with the similarly contoured rim of ring 52. The connecting rod is held assembled to ring 52 by a screw 59 fitting into a threaded well in ring 52.

Rod 55 is also held detachably assembled to crank pin 50 by means of a slider 60 slidable lengthwise of slot 57 and which is firmly anchored in any adjusted position therealong by means of a set screw 61. When the set screw is loosened the slider is free to slide lengthwise of connecting rod 55 but when it is tightened the slider is firmly clamped to rod 55.

Either or both sides of slot 57 are provided with a graduated scale 65 to facilitate clamping slider 60 in any desired position lengthwise of the connecting rod and rendering the rod either more or less effective in introducing different variable compensating factors into the driving mechanism 34.

In order that multiple cutting torches may be reciprocated simultaneously in the same or opposite directions, the invention machine preferably includes a flexible operating connection in the form of a tensioned cable 68, 70 interconnecting the two rods 25, 25. One end of cable 68 is anchored to a bracket 71 secured to the lower drive rod 25 as viewed in FIGURE 1 and its other end passes over a pulley 72 to a counterweight 73 operating in a well formed in the floor. One end of cable 70 is likewise secured to bracket 71 and passes over idler rollers 75 positioned as shown and mounted on the main frame. It will be noted from FIGURE 1 that cable 70 has two parallel portions located closely beside the upper one of rods 25. Either of these parallel sections of the cable can be clamped to a bracket 77 fixed to rod 25. To this end the bracket is provided with a pair of set screws 78, 79 effective when tightened to clamp one or the other sections of cable 70 to bracket 77. The free end of the cable 70 passes over an idler roller 81 to a counterweight 82 operating in another well formed in the floor of the foundation.

It will therefore be recognized that the two counterweights 73 and 82 cooperate in maintaining the cables 68 and 70 highly tensioned at all times with the result that any reciprocal movement imparted to the lowermost drive rod 25 in FIGURE 1 will be effective to drive the other rod 25. The second rod will be driven in unison with the first rod but in a direction which is dependent upon which of the thumb screws 78, 79 of bracket 77 are tightened against cable 70. If thumb screw 78 is tightened, then the two torches 20, 21 will be reciprocated in opposite directions whereas if thumb screw 79 is the one tightened then the two torches will be driven in the same amounts and in the same direction.

Figure 6:
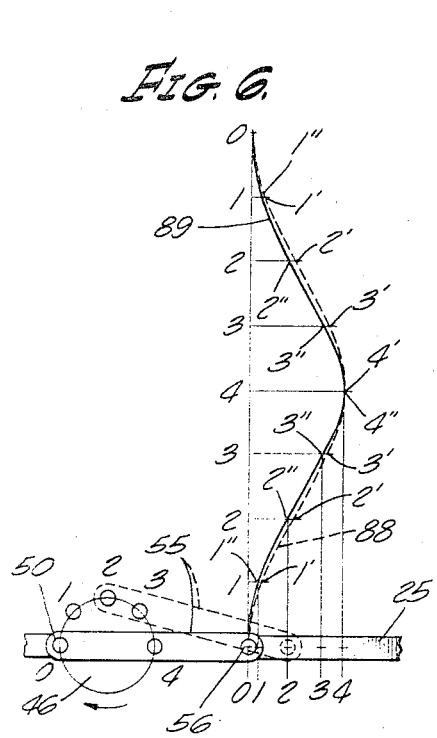
FIGURE 6 is a diagrammatic view corresponding generally to FIGURE 3 and illustrating a proportion of the developed cut obtained with the cutting torch when the drive mechanism is adjusted suitably for cutting the branchout and header junction shown in FIGURE 5.
Figure 5:
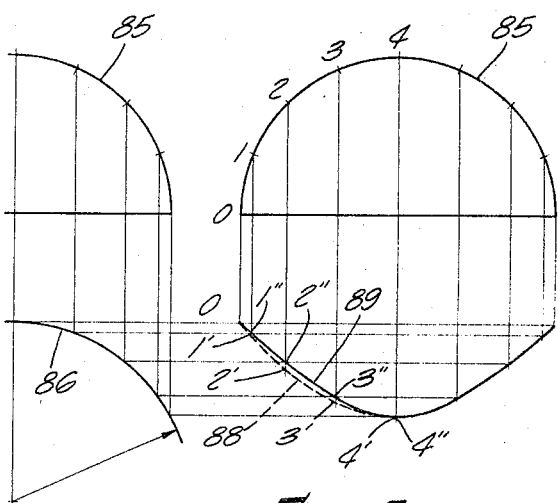
FIGURE 5 is a schematic view showing the details of the line of junction between one selected header pipe and a branchout lying at right angles to the header.

Referring now to FIGURES 5 and 6, there is shown an illustrative adjustment of the torch drive mechanism and appropriate to cut the end of a branch pipe 85 for junction with a header 86, and with the branchout lying at 90 degrees to the axis of the header. In this instance, it will be understood that the power transmission box 37 is adjusted to reciprocate the torch driving rods 25 through two complete cycles for each revolution of branchout 85 undergoing cutting. The dotted line trace 88 in FIGURES 5 and 6 represents the path the cutting torch would take under these particular circumstances if crank pin 50 were employed to drive rod 25 (as shown in FIGURE 9) whereas the full line trace 89 in these figures represents the true parameter obtained by introducing an appropriate negative correction factor in accordance with the principles of this invention. In other words, it will be appreciated from a consideration of these figures that the length of elements of trace line 88 are too long and that, for a proper connection with header 86, the parameter or edge desired should have the shorter elements represented by the full line trace 89. By properly selecting the point at which crank pin 50 and slide 60 are connected to connecting rod 55 and by conecting the remote end of rod 55 to rod 35 on the right hand side of eccentric 46, as shown in FIGURE 6, there is introduced an appropriate variable negative corrective factor in the drive connection to the cutting torches.

Referring now to FIGURES 7 and 8, there is shown schematically a typical adjustment of the torch driving mechanism when the branchout pipe 85' is connected to a header 86' at an angle of 45 degrees. The dotted line trace 95 in FIGURE 8 represents the parameter of the end of pipe 85' if trimmed without the use of connecting rod 55, whereas the full line trace 96 represents the desired shape or parameter in the end of branchout pipe 85'. To be noted in particular is the fact that when the branchout is located at an acute angle to the header the crank, represented by disc 46 and crank pin 50, provides a parameter on the end of the branchout which is appreciably shorter than actually necessary to form a proper junction with the header. This positive corrective increment is obtained by connecting the remote end of connecting rod 55 to rod 25 on the opposite or left side of disc 46 as viewed in FIGURE 8 from that used when making a right angle cut on the end of the branchout. In this connection it is pointed out that gear box 37 is adjusted to reciprocate rods 25 through one complete cycle for each revolution of the pipe undergoing cutting.

The manner in which the device operates to provide a positive correction of a continuously varying nature will be apparent from a consideration of FIGURES 7 and 8 and the series of elements representing the parameter 96 of the cut actually formed in the pipe by the cutting torch as the pipe is rotated. The elements shown represent 180 degrees of the complete revolution, it being apparent that the corresponding elements for the other half of the revolution are identical with those shown. In the example shown in FIGURES 7 and 8 element 8–8″ is the longest one and it will be noted that the portion 8′ and 8″ thereof in FIGURE 7 coincides with the similar portion in FIGURE 8.

Let it now be assumed that the machine has rotated the pipe through a short arc to position 5. The cutting torch will then be positioned to cut the pipe with an element having the length represented by 5–5″. The correction factor introduced by connecting rod 55 is represented by the distance 5′–5″. The longest correction factor is that indicated at 4′–4″, all other correction factors shown in FIGURE 8 decreasing by a variable amount until the pipe has been rotated one-half a revolution at which time the correction factor is zero.

Referring now to FIGURE 9, it is pointed out that connecting rod 55 has been replaced by the alternate accessory 98 which is clamped to the torch carrying rod 25 in any suitable manner with its face bearing against crank pin 50. A counterweight or a tension spring, not shown, will be understood as acting on connecting rod 25 to maintain accessory 98 in contact with crank pin 50 at all times so as to require the cutting torch to follow and bear against the crank pin. Alternatively, a suitably contoured cam can be anchored to disc 46 with its rim bearing against accessory 98 or other suitable device such as an antifriction bearing secured to rod 25. By this means a parameter of any desired configuration may be cut on the end of pipe 15.

While the particular simplified automatic pipe cutting machine herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A cutting torch drive mechanism for use in coordinating the rotation of a tube about its axis with the reciprocation of a cutting torch lengthwise of the tube, said mechanism comprising means to reciprocate cutting torch means lengthwise of a pipe, an input connection adapted to be connected with means for rotating a tube to be cut, adjustable-throw crank means driven by said input connection and including a crank pin mounted adjustably on an eccentric rotatable with said input connection, and a connecting rod of adjustable length having one end journalled to said crank pin and its other end journalled to said reciprocable cutting torch means.

2. A drive mechanism as defined in claim 1 characterized in that the reciprocation of the end of said connecting rod remote from said crank means includes means for confining the path of said remote end to a plane parallel to the axis of a tube to be cut by the cutting torch.

3. A drive mechanism as defined in claim 1 characterized in that said crank means comprises plate means fixed to one end of said rotatable connection, means supporting a crank pin and including means for clamping said pin supporting means selectively in different adjusted positions to vary the throw of said crank pin.

4. A drive mechanism as defined in claim 3 characterized in that said plate means comprises a shallow cup-shaped member fixed to said rotatable input means with its center offset from the center of said input means, a crank pin supporting disc seated loosely against the bottom of said cup-shaped member with their peripheral edges opposite one another, said crank pin being offset radially from the center of said disc, and manually operable clamp means for clamping said disc in any desired adjustable position relative to the bottom of said cup-shaped member.

5. A drive mechanism as defined in claim 4 characterized in the provision of scale means along the juxtaposed peripheral edges of said disc and said cup-shaped member calibrated to indicate the length of the excursion path traveled by the remote end of a connecting rod having its other end journalled to said crank pin during one complete revolution of said cup-shaped member.

6. A drive mechanism as defined in claim 1 characterized in that said cutting torch drive means is reciprocable in a path extending transversely of the path of rotation of said crank means, and means for connecting said connecting rod to said torch driving means selectively on either side of said crank means thereby to introduce a positive and a negative correction factor into the drive for said reciprocable torch drive means depending upon which side of said crank means said connecting rod is connected to said torch drive means.

7. A drive mechanism as defined in claim 1 characterized in that said reciprocable torch drive means includes a plurality of independent pipe cutting torches connectable to one another for reciprocation in unison.

8. A drive mechanism as defined in claim 1 characterized in that said reciprocable torch drive means includes a plurality of pipe cutting torches and means for reciprocating said torches selectively in the same direction and in opposite directions.

9. A drive mechanism as defined in claim 1 characterized in that said adjustable throw crank means and said connecting rod of adjustable length are separately adjustable to facilitate cutting the end of a branchout pipe from a header pipe throughout a wide range of pipe sizes and selectively for branchouts generally at right angles and branchouts generally in the range of 30 to 60 degrees to the header pipe.

10. A drive mechanism as defined in claim 1 characterized in that said cutting torch means includes means adjustable to direct the cutting action thereof selectively at different angles relative to the longitudinal axis of the pipe undergoing cutting.

11. A drive mechanism as defined in claim 1 characterized in that said means for reciprocating a plurality of separate cutting torches includes a tensioned flexible load transmitting means and means for maintaining the same tensioned irrespective of the direction in which any one of said cutting torches is being reciprocated.

12. A drive mechanism as defined in claim 6 characterized in the provision of an accessory for use selectively in lieu of said connecting rod and effective to provide a driving connection between said crank means and said reciprocable drive for said torch cutting means when no correction factor is required.

References Cited

UNITED STATES PATENTS 2,726,450  12/1955  Ware.

JOHN J. CAMBY, *Primary Examiner.*